United States Patent
Rebuli

(10) Patent No.: US 8,750,510 B2
(45) Date of Patent: *Jun. 10, 2014

(54) DUPLICATION MEANS FOR AN ELECTRONICALLY CODED KEY AND RELATED METHOD

(75) Inventor: David Rebuli, Trebaseleghe (IT)

(73) Assignee: KEYLINE S.p.A., Conegliano (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/747,084

(22) PCT Filed: Mar. 26, 2010

(86) PCT No.: PCT/EP2010/054015
§ 371 (c)(1),
(2), (4) Date: Jun. 9, 2010

(87) PCT Pub. No.: WO2010/142474
PCT Pub. Date: Dec. 16, 2010

(65) Prior Publication Data
US 2011/0123026 A1    May 26, 2011

(30) Foreign Application Priority Data
Jun. 10, 2009   (IT) ............................. PN2009A0038

(51) Int. Cl.
*B60R 25/04* (2013.01)
*B60R 25/00* (2013.01)
*G07C 9/00* (2006.01)

(52) U.S. Cl.
CPC ............... *B60R 25/04* (2013.01); *B60R 25/00* (2013.01); *G07C 9/00817* (2013.01); *G07C 9/00174* (2013.01)
USPC ......... 380/270; 380/255; 340/5.61; 340/5.65; 307/10.1; 307/10.2; 307/10.6

(58) Field of Classification Search
CPC ...................................................... B06R 25/04
USPC ................................. 380/270; 340/5.61–6.64
See application file for complete search history.

(56) References Cited

U.S. PATENT DOCUMENTS 5,596,317 A  *  1/1997  Brinkmeyer et al. ........ 340/5.26
5,838,251 A     11/1998  Brinkmeyer et al.
(Continued)

FOREIGN PATENT DOCUMENTS

DE   44 18 069 C1   8/1995
EP   1339024        8/2003
(Continued)

OTHER PUBLICATIONS

PCT/EP2010/054015—International Search Report, May 6, 2010.
(Continued)

*Primary Examiner* — Alexander Lagor
(74) *Attorney, Agent, or Firm* — Oblon, Spivak, McClelland, Maier & Neustadt, L.L.P.

(57) ABSTRACT

Method for the duplication of original electronic keys used in the automotive transports, and provided with coded and encrypted electronic authentication means, comprising: an Identification Code (ID), an encrypted secret code, a Password, an algorithm, data storage and computing means, able of being used in vehicles provided with a central processing unit able of storing an Identification Code (ID), an encrypted secret code, a Password, an algorithm, said duplication method being able of obtaining a duplicated key based on a blank key, which is originally provided with an algorithm, data storage means able of storing said Identification Code (ID), said secret code and said Password, wherein said data storage means are initially empty; said duplication is based on a duplication means and on a method which allows of using the blank key as intercepting means of secret codes sent by the vehicle central processing unit, and of transferring said information to the duplication means itself.

11 Claims, 11 Drawing Sheets

(56) References Cited

U.S. PATENT DOCUMENTS

Figure 1A:
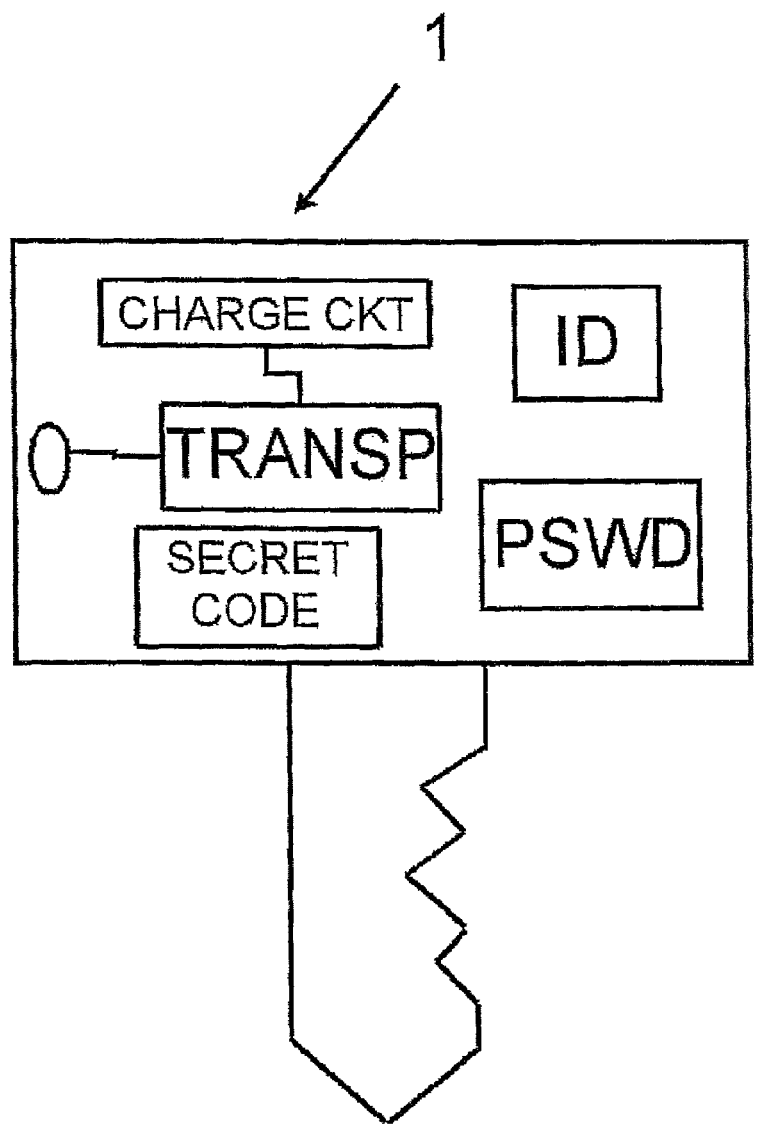
Figure 1B:
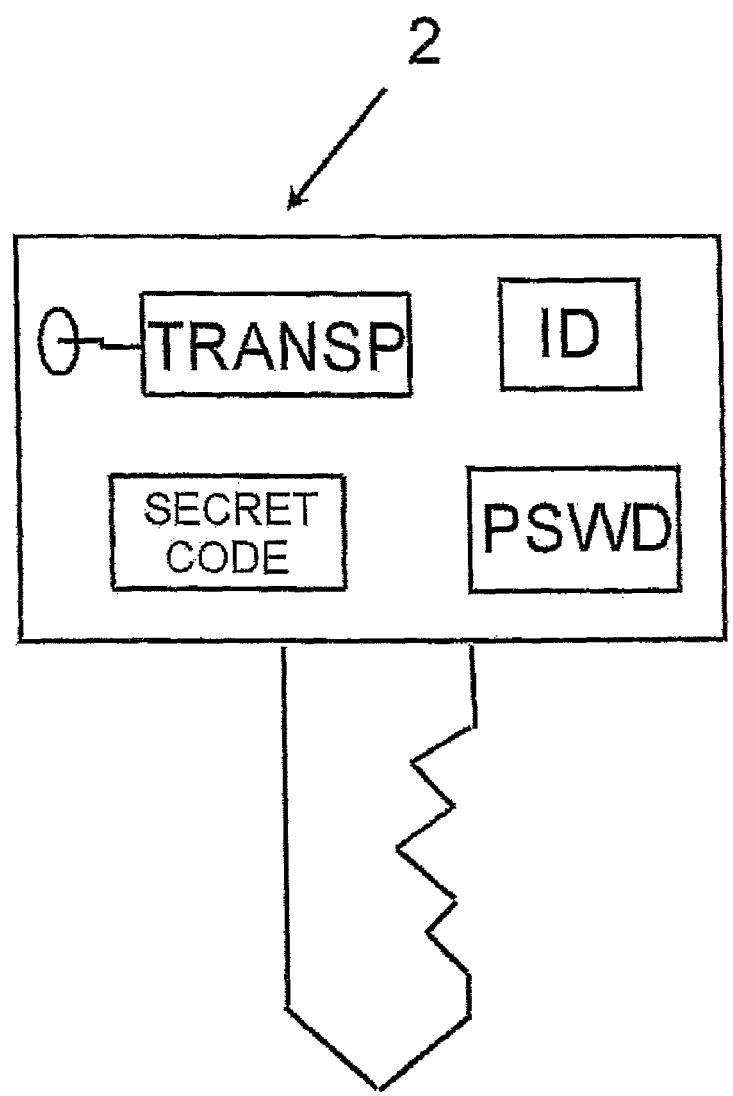
Figure 1C:
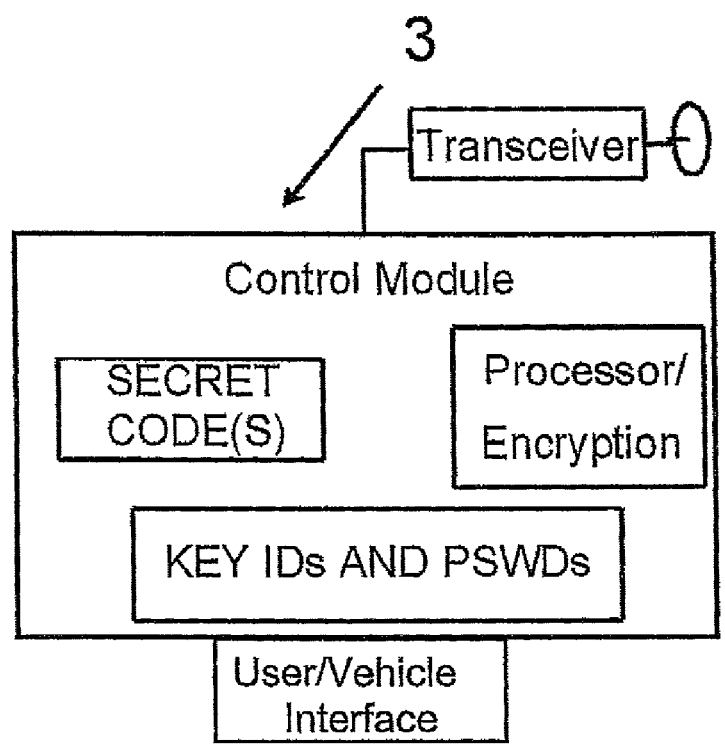
Figure 1D:
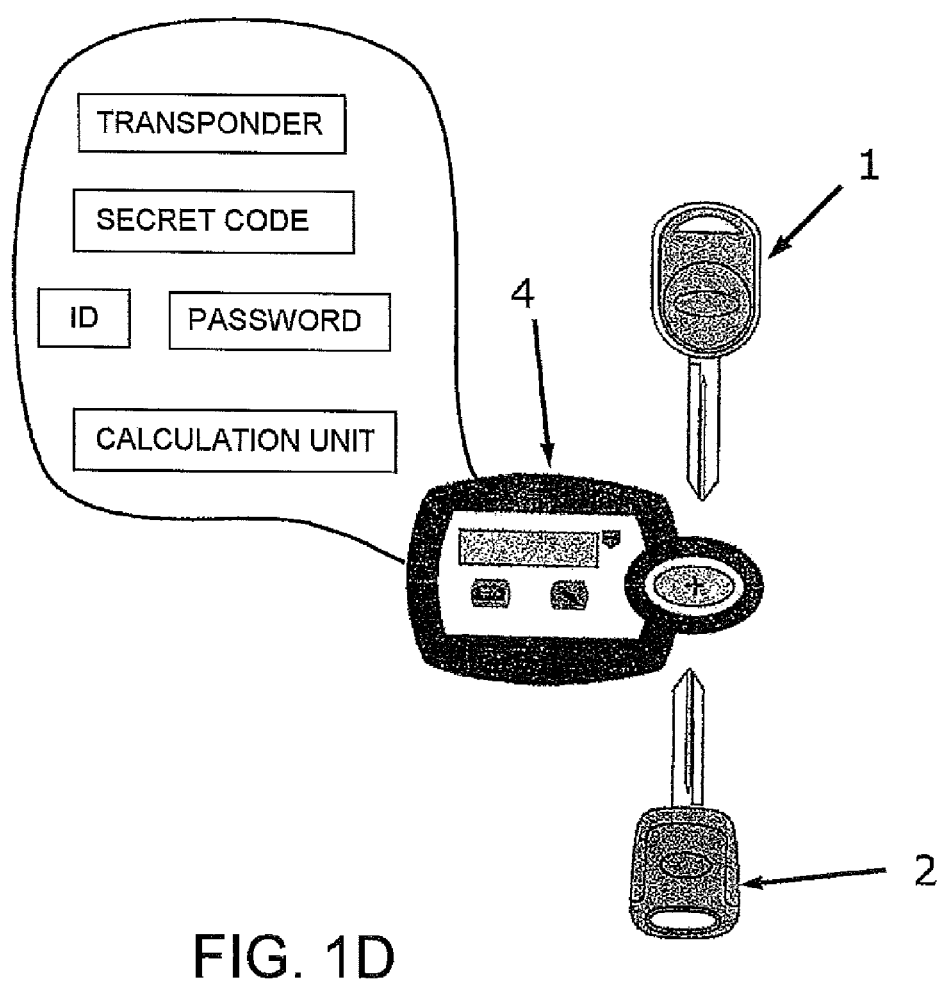

| | | | |
|---|---|---|---|
| 6,710,700 B1 * | 3/2004 | Tatsukawa et al. | 340/5.53 |
| 7,387,235 B2 | 6/2008 | Gilbert et al. | |
| 2001/0049066 A1 | 12/2001 | Katagiri et al. | |
| 2004/0078563 A1 | 4/2004 | Kimes et al. | |
| 2006/0208069 A1 * | 9/2006 | Gilbert et al. | 235/382.5 |

FOREIGN PATENT DOCUMENTS

| | | |
|---|---|---|
| GB | 2340644 | 2/2000 |
| GB | 2424293 | 9/2006 |
| WO | WO 2006/032354 | 3/2006 |
| WO | WO 2008/145199 | 12/2008 |
| WO | WO 2008145199 A1 * | 12/2008 |

OTHER PUBLICATIONS

PCT/EP2010/054015—Written Opinion of the International Searching Authority, May 6, 2010.

Office Action from the United States Patent and Trademark Office, mailing date Oct. 16, 2012, for U.S. Appl. No. 12/813,484.

* cited by examiner

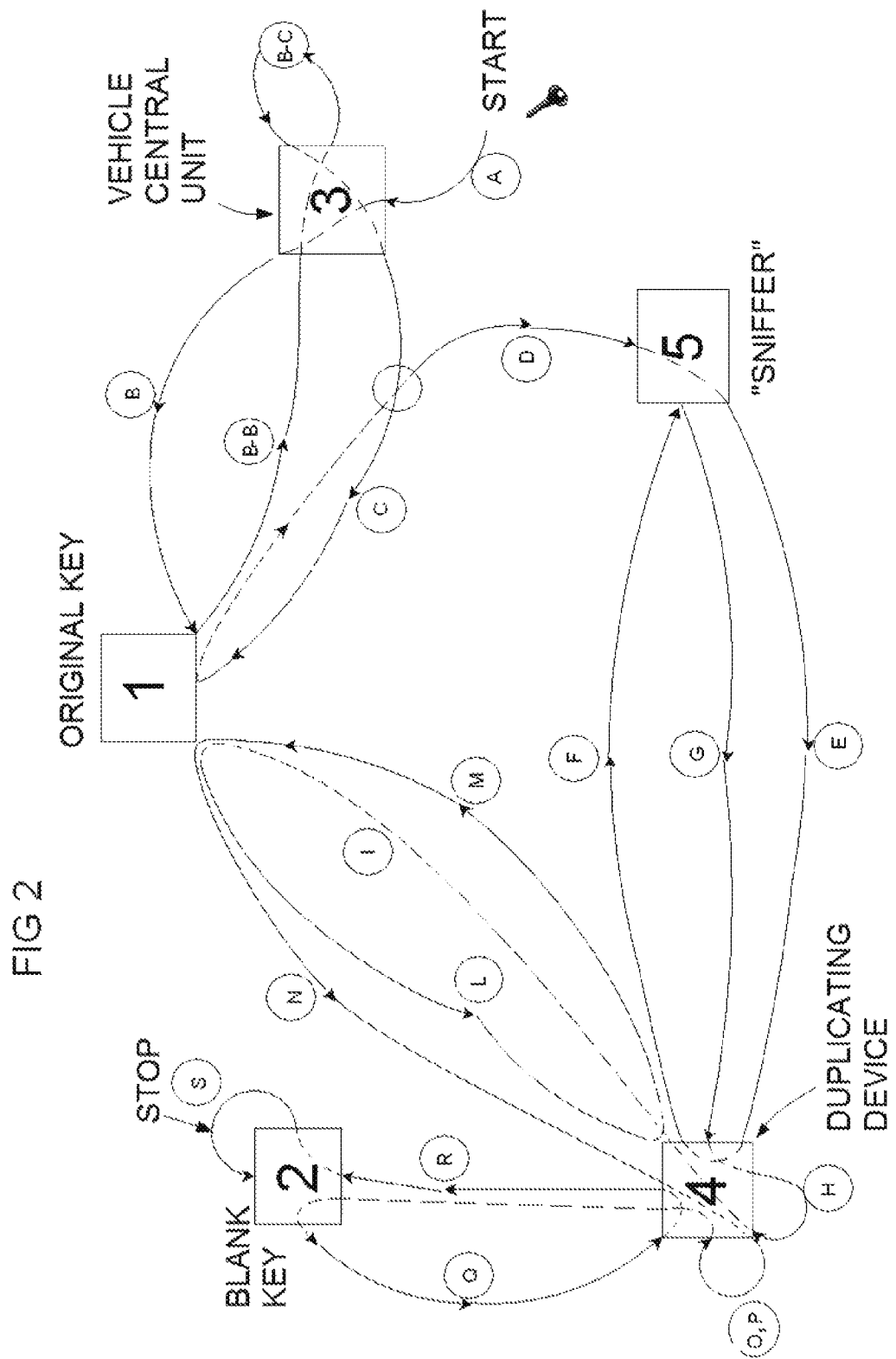

DUPLICATION MEANS FOR AN ELECTRONICALLY CODED KEY AND RELATED METHOD

CROSS REFERENCE TO RELATED APPLICATIONS

This application is a national stage application of International Application No. PCT/EP2010/054015, filed 26 Mar. 2010, which claims priority from Italian Patent Application Serial No. PN2009A000038, filed 10 Jun. 2009, from which applications priority is claimed, and which are incorporated herein by reference in their entireties.

This invention refers to some means able of duplicating keys provided with both a mechanical code, of the conventional type, and of an electronic code, also in se known and employed for years in several technical applications.

The invention also refers to some methods in order to use said means and which allows the duplication of one of these keys.

In the following of this description, and in the attached claims, it will be specifically referred to the mechanical and electronic keys used in the nowadays produced vehicles, but it is intended that the invention applies also in different fields, as for instance in the armoured door, a safe etc. ..., provided a key with a double mechanical and electronic code, a respective lock and a related electronic central unit able of processing the data stored into the electronic codes of the key to be duplicated, and transmitted by it, is used.

Moreover it is stressed that, even if it will be useless to the man skilled in the art, the invention applies to a central processing units and electronic keys wherein, before the central unit to allow the operation of the various vehicle functions, a double and mutual authentication between the electronic key and the central unit mounted in the vehicle itself is implemented.

The means and the method of said mutual authentication are broadly described in the U.S. Pat. No. 7,387,235 B2: "MUTUAL AUTHENTICATION SECURITY SYSTEM WITH RECOVERY FROM PARTIAL PROGRAMMING", assigned to Lear Corporation.

Just for it, in the facts, the original key, and therefore the duplicated one, are provided with a double code for the reciprocal authentication, one being called <<Secret code>>, and the other <<Password>>.

In the facts one of said codes is used by the central unit to authenticate the original key, and the second code is used by the original key to authenticate the central unit.

Figure 6:
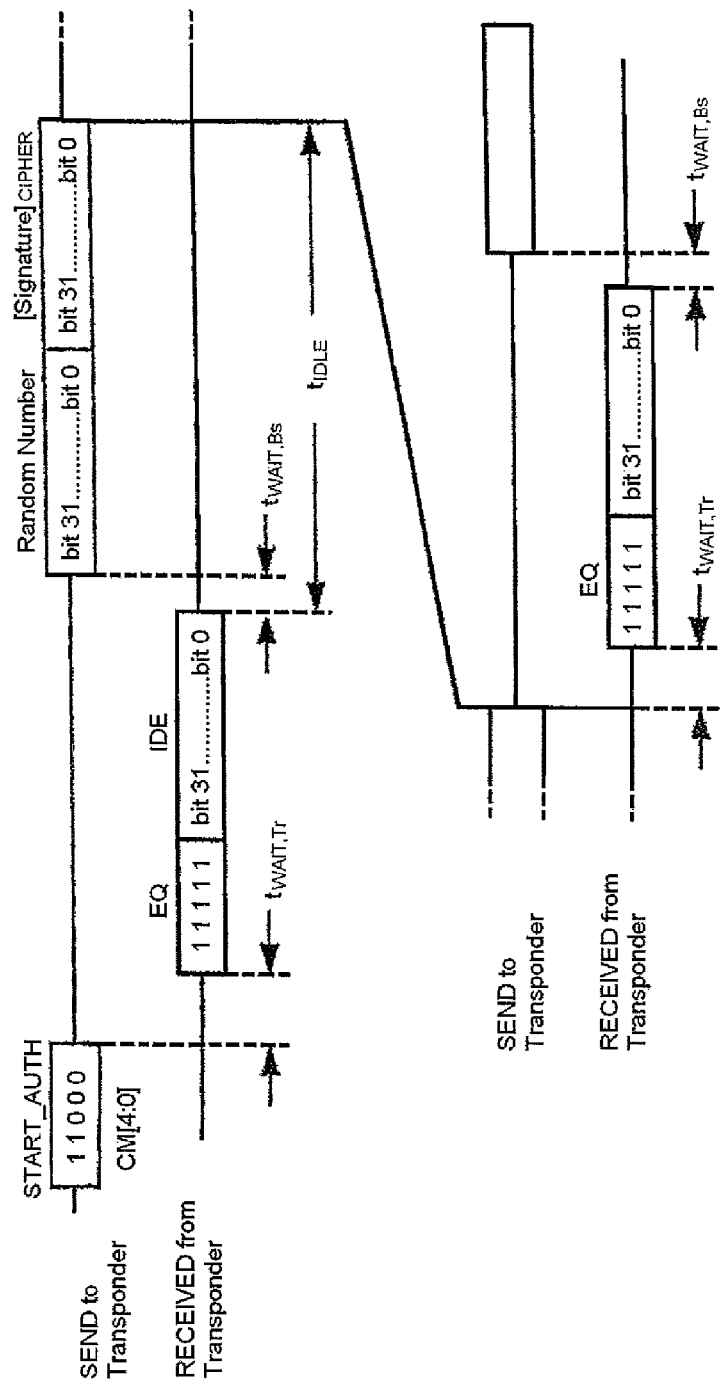

Furthermore, in order to easier introduce the man skilled in the art into the field and technique of electronic keys with mutual authentication, it is referred to the FIG. 6 of said prior patent, which shows a method of mutual authentication between an electronic key and a respective central unit, which is activated when the key is being inserted in its lock and turned until a suitable <<start>> signal is sent to the central unit itself; based on said Figure, the man skilled in the art is with no doubts able of identifying the technique field involved, and of easily guessing its innovation with respect to said technique field.

It is known that when it is desired, or it needs to duplicate in a legal way a mechanical or electronic key as described, several aspects have to be evaluated.

The second aspect regards the time-length and the cost required for the key duplication activity; usually the duplication request is urgent as the user has lost one of its keys, or he has to provide one or more extra keys to trustworthy peoples, as relatives, assistants etc.

The third aspect refers to the practicality and actual feasibility of the duplication operation; in particular it is wanted that the duplication activity be available in a indeterminate plurality of different stations for key duplication, well spread on the territory where the vehicle usually travels, so that the user, who wishes to duplicate a key may reach easily and quickly, and with the same quickness may get the required duplicated key which has to be therefore handed to the same station.

Various methods and means are known, which allow the duplication of electronic keys; such means and methods are extensively described in a number of patents, or related applications, among these we here cite:
U.S. Pat. No. 5,838,251 A,
US 2004/078563 A1,
EP 1 339 024 A,
WO 2006/032354,
GB 2 340 644 A,
PCT/EP2007/060856, (of the same applicant),
US 2001/049066 A1.

All such means and methods require, to duplicate an electronically coded key, a unique storing and processing center of a large quantity of keys of the considered type, and of the transmission means, typically on-line (internet), which are used to transmit and receive information from a local station that has to physically generate and deliver the duplicated key, and to which the client addresses, towards and from such storing, processing and coding/decoding center.

The teaching and the information showed in such documents can be generally well implemented, and some are actually realized.

However all of them show a common drawback which limits the operability and the quickness, and finally makes them less operable; such common drawback consists in that the key duplication requires:

a) the availability of an usually remote center, able of receiving, processing and generate the needed codes to make out the required key, and b) telecommunication means to transmit and receive the coded data, from the local station to said processing center, and vice-versa.

Such requirements obviously imply the existence and the correct operation of a specific organization, of trained and co-ordinated personnel and distributed on the territory, and of specific procedures which have to be carried out by said personnel both in the local station and in the processing center.

Obviously all that implies a higher operation complexity, organizational limits and so less reliable and convenient for an user who only asks the duplication of its key, in an easy way and without depending on outer and far-away centers, and on transmission and receiving means for the coded data.

It is then desirable, and is the purpose of the present invention, of making out a method for the duplication of electronic keys which eliminates the described drawbacks, be easily and safely usable and which can be carried out with means available in the technique.

This and further purposes are achieved by a method according to the attached claims.

Figure 1E:
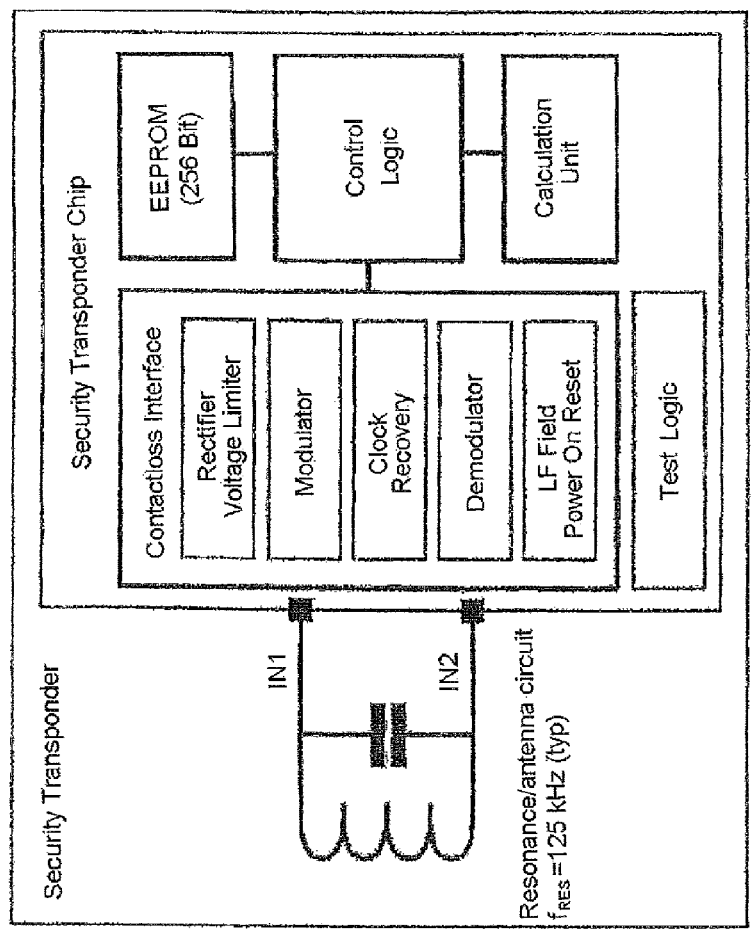
Figure 1F:
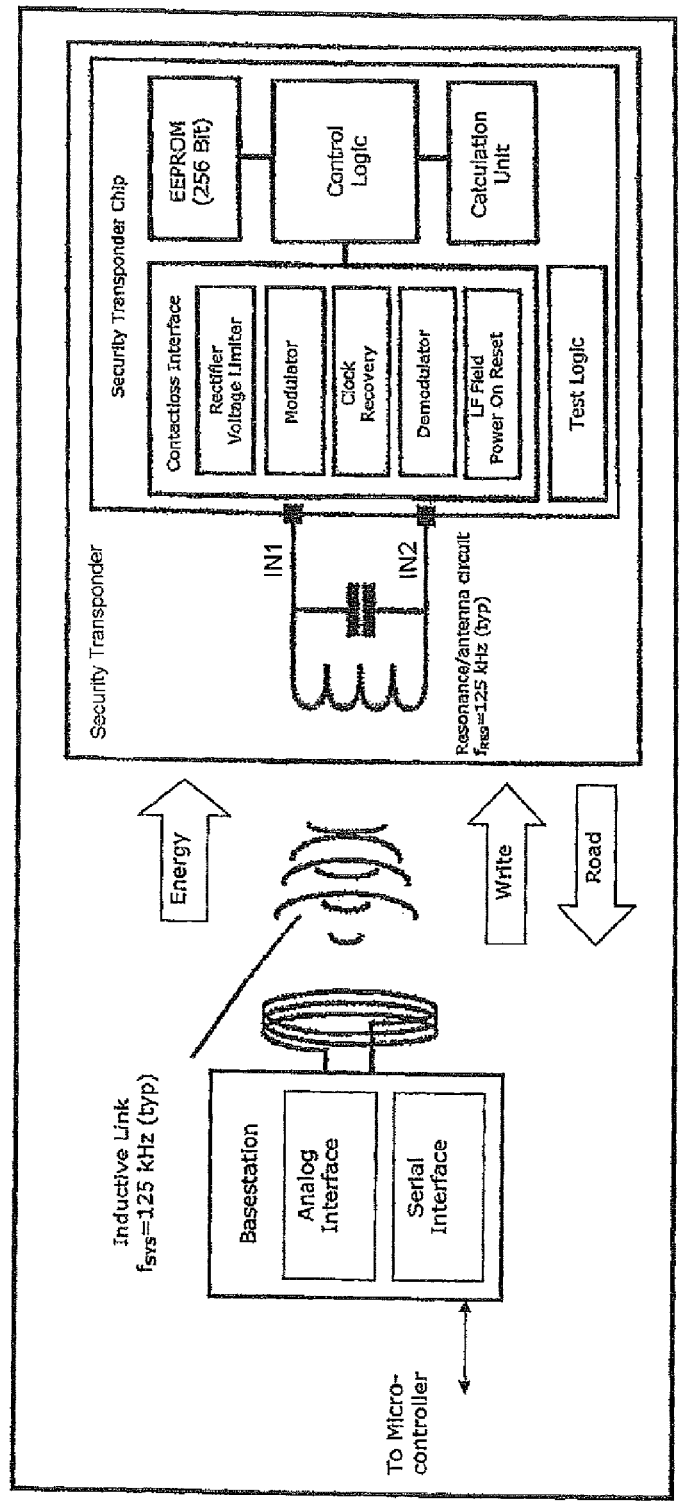
Figure 3:
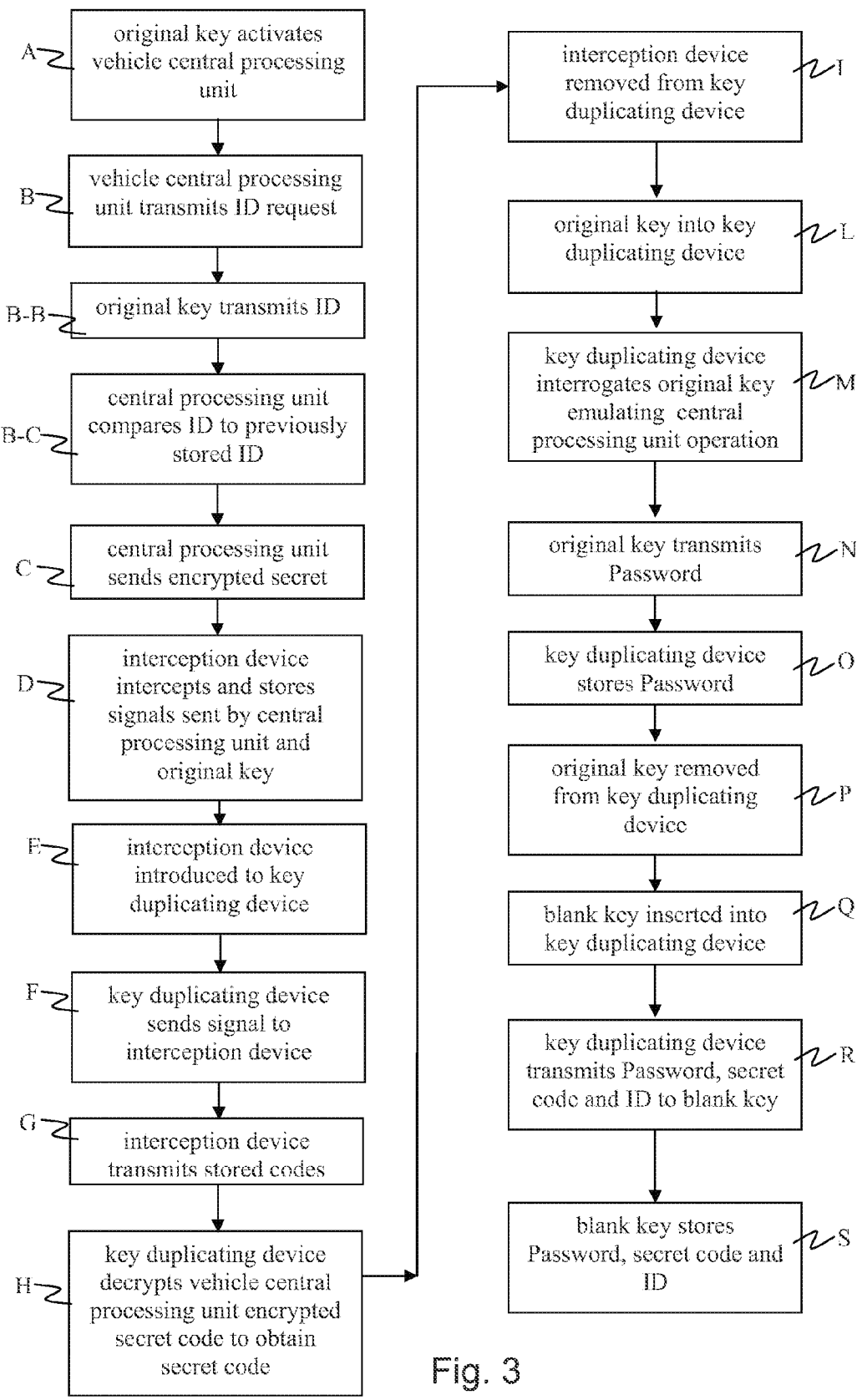
Figure 4:
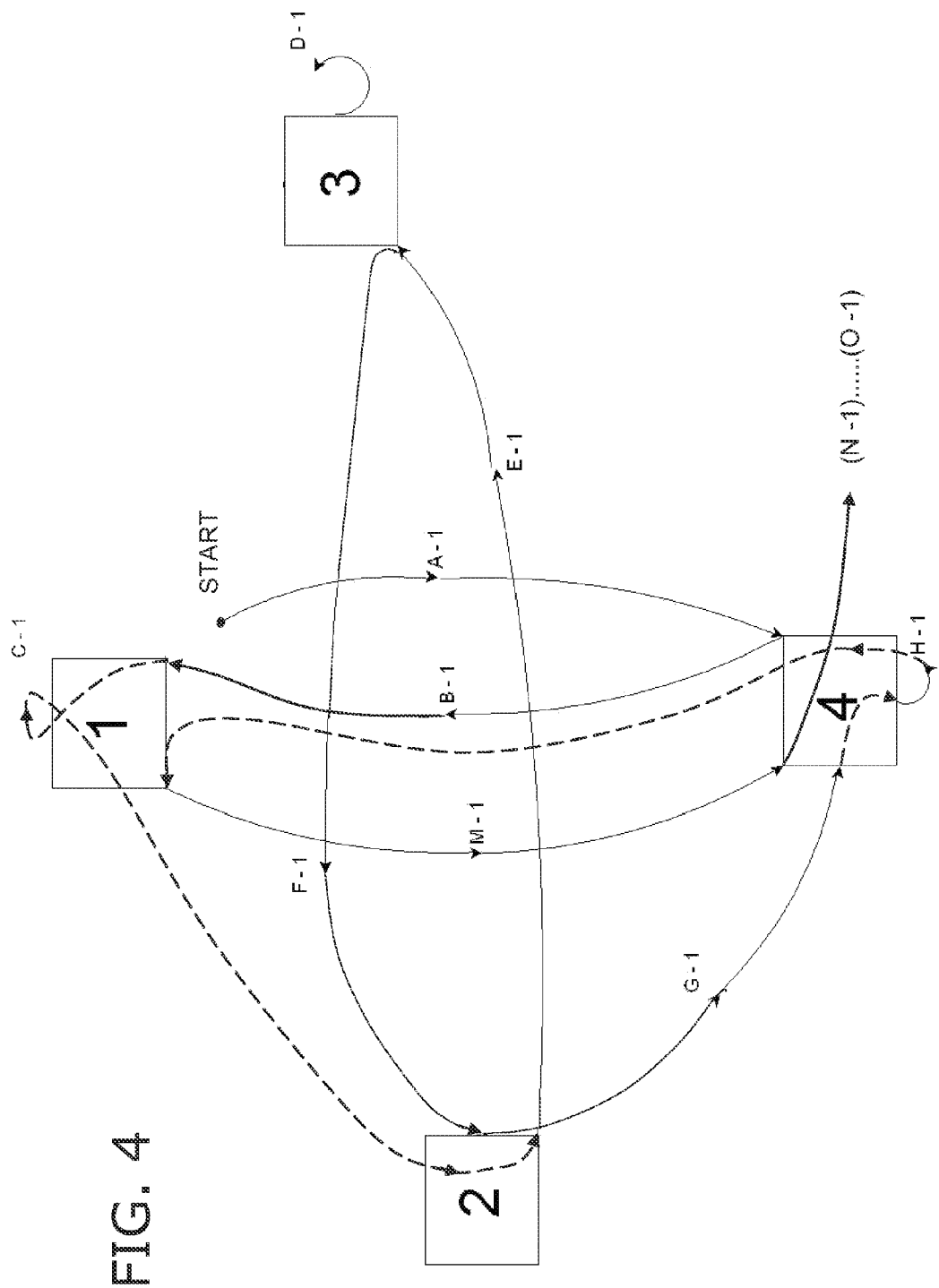
Figure 5:
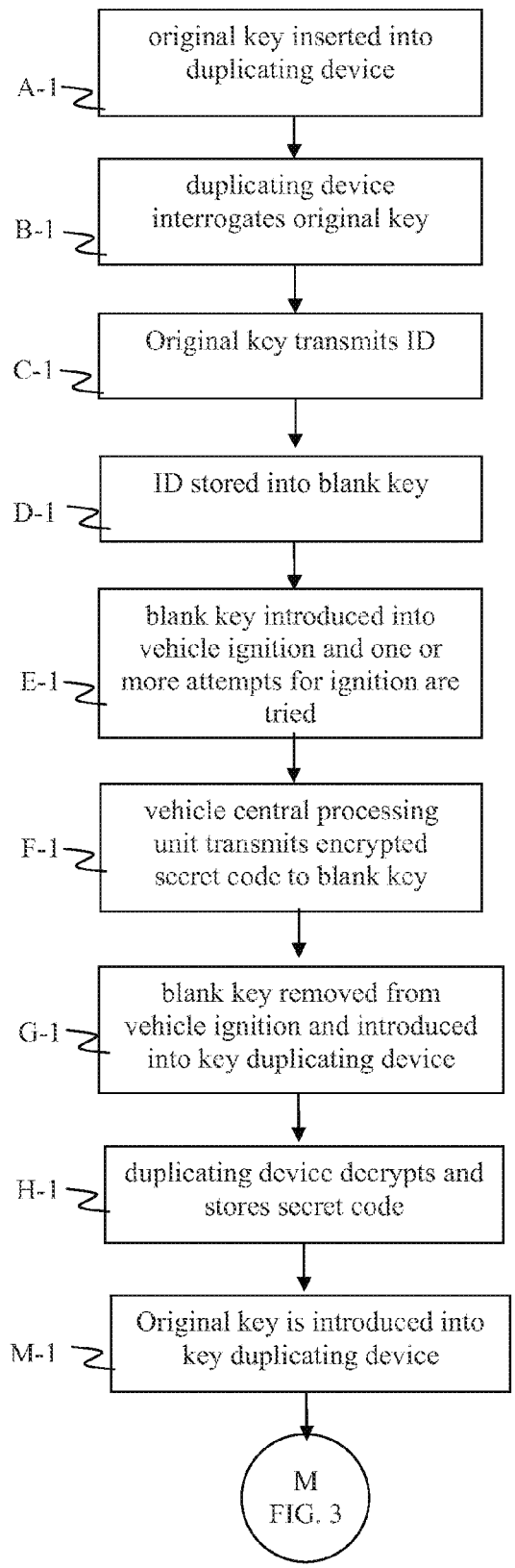

Features and advantages of the invention will result apparent from the following description, as non-limiting example, with reference to the attached figures, wherein:

FIGS. 1A, 1B, 1C and 1D represent respective means which have to be operated in the invention, and which show in a simplified and symbolic way their type and content both in the hardware and in the software, which take part to the invention method, FIGS. 1E and 1F show respectively in a simplified form the logical flow-chart of the various devices comprised in the original key and in the vehicle central unit, FIG. 2 shows a flow-chart of the various steps of the method according to the principle of the invention, FIG. 3 shows a schematic of the relationship among the various steps of the method of FIG. 2, and of the relationship among the various means which take part in the method of the invention, FIG. 4 shows a flow-chart of the various steps of an improved embodiment of the method according to the invention, FIG. 5 shows a schematic of the relationship among the various steps of the method of FIG. 4, and of the relationships among the several means operating in each of said steps, FIG. 6 shows a logical and schematic flow-chart of the sequence of the functions and of the reciprocal relationships between an electronic key and the respective central unit, implemented to work at a <<mutual authentication>> mode, With reference to the Figures from 1A to 1D, the method of the invention uses the following means:

A) an original key 1, which has to be duplicated, and provided with:
 a memory able of storing a secret code, a Password and an Identification code ID,
 a transponder comprising a suitable algorithm,
 a logical or computing unit,
 further devices, per se generally known, which allow to transmit and to receive, modulate/de-modulate the radio-electric signals transmitted and received.

While the Figures from 1A to 1D describe in a preferred way the content of the devices needed to the invention, FIGS. 1E and 1F in particular show the constructional and circuital content of the key and of the central unit installed into the vehicle, and which are needed to make the just cited devices to operate.

These devices are for long time mounted and working in the presently made vehicles, and therefore they are not new, but they represent without any exception the prior art, and moreover they do not need specific explanations as the man skilled in the art is perfectly able to immediately identify the construction type and the related working.

B) a blank key 2; such blank key comprises the same electronic and mechanical devices of the original key 1, but logically, it misses the own codes to allow the working of the same blank key, i.e. the secret code, The ID, and the Password; however the algorithm, identical to that one installed in the original key, and already known, is already installed into the blank key 2; furthermore logically the blank key 2 is provided with a mechanical profile, in se known, able of permitting the introduction of the key itself into the vehicle lock, and of operating on said lock just as the original key.

C) the vehicle or central unit 3, the original key 1 is used with, and that has to use the duplicated key 2 too, comprises means and devices which basically perform the same function of the original key, i.e.
 a memory able of storing a secret code, a Password, and an Identification Code ID,
 a transponder containing a suitable algorithm, in se known,
 a logical or computing unit,
 further devices, in se generally known, which allow of transmitting, receiving, modulating/demodulating the radio-electric transmitted and received signals.

Moreover said central unit 3 is provided with transmission means able of transmitting an enough powerful radio-electric signal to the original key engaged to the vehicle lock, so as to start the procedure for the mutual authentication between the original key and the central unite itself.

D) a duplicating device 4, whose composition and operation are, in the principle, still similar to those of the blank key 2, and which therefore, for the sake of brevity, will not again be explained.

However it is reminded that said duplicating device is provided with the same algorithm installed into the two keys 1 and 2, and with a particularly quick and powerful computing unit, whose function will be described later on.

As for the duplicating device 4, it is generally divulgated in the patent application No. PCT/EP2007/060856 and there described as <<reading/writing unit 13>>.

Therefore it acquires a data that is randomly encrypted into a first encryption form.

Then it is provided with:
 a) an inner memory and a reading knob to write the code contained into said inner memory,
 b) a small antenna able of receiving a radio-electrical signal containing a code, of transferring said code into said inner memory and, on a defined command on the writing knob, of re-transmitting outwards said code stored into it,
 c) computing means particularly designed and produced to process at a high speed the encrypted secret code, and to identify in a very reliably way the secret code after its decryption, E) a device able of receiving the electro-magnetic signals coming from the central unit 3 of the vehicle, and that therefore will be called sniffer 5.

Said sniffer 5 is a device able of receiving a radio-electric signal comprising one or more codes, to store said codes without making any processing on them, and to re-transmit them, according to a pre-determined command given to it, to said duplicating device 4.

It will be also apparent that the sole function of the sniffer 5 is to intercept the signal coming from the central unit 3, to store it and to deliver it, on a command of the duplicating device 4, into the same duplicating device 4 which stores it into the suitable memories.

The method of the invention is based on the following strategy: shortly speaking, said strategy is based on the <<interception>> of a part of the communication between central unit and original key, on the <<substitution>> of the central unit itself through a proper means (the duplicating means 4 which is therefore enabled to perfectly emulate the central unit 3), on the interrogation—for the second time—of the original key in order to catch also the last part of its information, and therefore in the transferring all information to the blank key.

To sum up, going now to the operating modes, in order to implement the duplication of the blank key, the original key is as <<interrogated>>; such interrogation is achieved by introducing it into the vehicle lock.

(it is here omitted the step of the recognition of the ID of the original key by the central unit 3; however such step will be resumed in the complete sequence of the operating steps, which will be repeated and explained with great detail in the following).

So the central unit 3, in a known way, transmits a radio-electric interrogation signal, properly coded and encrypted by the algorithm in it installed; said interrogation encrypted signal, sent to the original key, is however received also by the sniffer 5.

The sniffer intercepts the communication between the original key and central unit, i.e.:
 the interrogation code transmitted by the central unit, and the secret code transmitted, as the answer, from the original key.

The sniffer 5 however stores only the encrypted code coming from the central unit 3 and neglects the encrypted code, as the answer, coming from the original key 1.

At this time the duplicating device 4, provided from the beginning with the same algorithm, is also provided with the interrogation code of the central unit 3.

This duplicating unit 4 is then enabled to implement a very complex and quite long-lasting mathematical processing, in order to exploit the algorithm installed into it to decrypt the secret code from the encrypted signal generated by the central unit 3.

Such very complex processing is based on specific mathematical functions, and in se well known to the man skilled in the art, and must be implemented by proper processing means, which may be either comprised inside the duplication device 4 itself, or made-up by external means, to be connected to the duplication device 4 itself; however such type of embodiment is not included in the present invention, and therefore it will not further detailed.

However it is possible that, from one interrogation only of the central unit, a decrypted signal which could result insufficient to identify in a reliable way the true central unit secret code; therefore an advantageous improvement of the instant method consists in the acting the original key into its lock a number of times and successively, so as to receive from said central unit a corresponding plurality of encrypted signals which are different from each other, but which are all, if properly decrypted, to supply information in all suitable to identify the exact secret code.

It is obviously possible to carry out only one activation of the central unit 3, which therefore replies with only one coded decrypted code; however said signal could be insufficient for the duplicating device 4 to identify in an unambiguous way the secret code, and therefore it comes out to be particularly profitable to make out a sequence of activations of the central unit 3, what is practically done by making, at the beginning of the method, a series of successive rotations of the original key into its lock, which allows to give raise respective answering signals from the central unit which, properly recorded by the sniffer 5, are all flown into the duplicating device 4.

After having processed the received encrypted codes, the duplication device 4 selects the secret code from the central unit 3, and stores it into its memory.

By introducing then into the duplicating device 4 the original key 1, it, correctly interrogated by the duplication device 4 which transmits the secret code-encrypted by the algorithm now recognized by the central unit 3, replies as it received the signal of the central unit 3, as it receives the same signal; it therefore <<believes>> to be interrogated by the central unit, and therefore replies transmitting its own Password.

At this time the duplicating device is also informed about the Password of the original key, and therefore may store it and transfer it into the blank key, which successfully and as last operation is introduced into the duplication device 4.

To sum up, the invention strategy is based on the circumstance of <<intercepting>> the exchange of some information (Identification number ID, and secret code) between the original key and the vehicle central unit, of storing them and of transferring them on a proper storing means, i.e. the duplicating device 4.

It may code the central unit secret code, and then emulate the central unit working; therefore, when interrogated by the original key, receives from it the password too.

Then the duplicating device is informed of the secret data of the original key, i.e. the ID, the secret code and the PASSWORD.

Finally all these information are transferred from the duplicating device 4 into the blank key, which then acquires all information of the original key.

With reference to the FIGS. 2 and 3, the actual practical method, represented in great detail through a flow-chart, is the following:

Step A) the original key is inserted into the vehicle lock, and is rotated until it closes the electric circuit which activates the central unit of the vehicle itself; profitably such rotation of the original key, and the relevant activations of the central unit 3, are more than one, and are made up in sequence.

It was also verified and evaluated that the optimum number to get a sufficient number of encrypted codes, and that may be afterwards certainly decrypted by the duplicating device 4 to get the secret code, is of three activations/rotations of the original key inside the respective lock.

It is in the fact apparent that the more the information available on a certain condition, the more are the chances of faithfully representing that condition and of avoiding identification mistakes.

Step B) The central unit transmits a radio-electric signal comprising a code of identification request of the original key, that is the ID, which is an <<open>> code;

Step B-B) The original key receives such signal requesting of said <<open>> ID, and transmits that code to the central unit 3;

Step B-C) The central unit receives said open ID code and compares it to a previously stored ID code; if it is recognized, such recognition allows the procedure continuation;

Step C) The procedure goes on; the central unit 3 sends a random encrypted code which comprises the secret code, from the algorithm, to the original key 1;

Step D) An intercepting device 5, called sniffer, arranged close to the original key, intercepts the radio-electric signal which contains both the ID of the original key, and the interrogation of the central unit, and the key reply, i.e. its secret code in an encrypted form; however the latter is not stored, and the sniffer records and stores the central unit 3 interrogation only (the sniffer positioning close to the lock is preferably done before introducing the original key);

Step E) Said sniffer 5 is introduced into said duplicating device 4;

Step F) Said duplicating device 4 emits a radio-electric signal which reaches said sniffer 5;

Step G) Said sniffer transmits to said duplicating device 4 an electric signal with the random code encrypted by the algorithm which comprises the secret code, stored during the Step D;

Step H) The duplicating device 4 stores the random code generated by the central unit 3 and, through a plurality of mathematical functions and proper computing means decrypts said encrypted code, so obtaining the sought code.

Now the duplicating device contains the secret code, decrypted, of the original key 1.

Step I) The sniffer 5 is removed from the duplicating device 4;

Step L) Into the duplicating device 4 the original key is inserted;

Step M) The duplicating device interrogates the original key with a suitable radio-electric signal which comprises the secret code encrypted by its algorithm, so emulating the central unit operation;

Step N) The original key replies by transmitting a further own code, i.e. the encrypted password;

Step O) The duplicating device stores such Password;

Step P) The original key is removed from the duplicating device;

Step Q) The blank key is introduced into the duplicating device;

Step R) The duplicating device transmits a radio-electric signal to said blank key, so transferring to it the PASSWORD, the secret code and the ID;

Step S) The blank key stores into a definite memory all said three codes.

So the duplication of the blank key is completed.

To be noted now a profitable improvement of the method, which allows a certain simplification; in the facts, if in the Step D or of interception, the sniffer 5 intercepts and stores also the secret code of the original key, the Steps M and N would be no more needed, as the secret code transmitted by the original key would have been already transmitted to the sniffer 5, and then from it to the duplicating device 4, which could immediately emulate the central unit 3 to interrogate the original key to let it transmitting to himself the respective Password.

However such methodological simplification raises the risk that, as the signal carrying the secret code of the encrypted key is very weak, due to the fact that it is emitted by the original key which is supplied by the radio-electric signal emitted by the central unit, then such signal with the encrypted secret code may be easily jammed, or anyway may be received in an incomplete or wrong, which obviously causes the interruption of the key duplication procedure.

It is to be noted moreover that some of the above described Steps are typical manual operations, that an outer operator must perform on the described means, as introduce a key and rotate it inside the lock, extract a key, activate the duplicating device, move the sniffer etc. . . . , as the remaining steps are automatic steps which are carried out by said means in a known way.

More specifically the manual steps are Steps A, E, I, L, Q.

Steps B-C, H, O, S are steps of mere processing/comparison/storage into the respective devices, without any relationship to the other devices and therefore are only symbolically drafted.

Step D regards the intercepting action of the sniffer 5, which however shall be manually arranged and prepared close to the lock, and therefore it is intended that the sniffer positioning 5 requires an additional operation which here is not listed as a real operating Step.

By carefully observing the FIG. 2, it turns out to be apparent, also only by a visual check, the nature of the method strategy; as a matter of facts the original key 1 and the central 3 are put into relationship to each other (Steps A and B), so that the central unit is made to recognize and store the content of the codes stores in the original key; afterwards said codes are intercepted by the sniffer 5 (Steps C and D), which provides to transmit them to the duplicating device 4 (Steps E, F and G).

At this time the original key 1 also is introduced into the duplicating device 4 (Steps I, L), which interrogates said original key (Steps M, N) to get the answer with the password (Steps M, N).

Finally, after the Step P all coded information, originally stored in the original key 1, are contained inside the duplicating device 4, and therefore it is now possible to introduce the blank key 2 and transfer to it all said coded information.

The just described solution, which is effective, sure, and innovative, allows then a complete duplication of a blank key from an original key which uses the technique of the "mutual authentication", without having to connect to any data-base placed in a remote site, accessible only with on-line means to assure the security of the code transfer.

However such method implies the presence and the working of the sniffer 5; but such constraint and need are not deprived of penalization; in the facts the presence of the sniffer 5 shows some critical aspects, as it has to work with radio-electric signals that may be miss-received and therefore may introduce errors in the transmission of information and codes; moreover the sniffer operations are delicate, and precise operations which must be carried out with great caution and with the right sequence; all that may be troublesome and unpleasant in a working environment which is little trained and sensible to the remarkable technical complexity of the involved means and methods. Such drawback often is considered not agreeable, even because it requires a cost increase and a higher complexity of the duplication procedure.

In order to avoid such problems, in the following a method is described which allows to carry out the duplication of an original key without using the sniffer.

The strategy of such improvement consists in that the blank key is used as sniffer, in the meaning that the central unit codes are introduced into the duplicating device through the blank key itself.

However to make it possible to use the blank key as "carrier" of such information, the blank key must have been previously loaded with the ID of the original key.

To this purpose, the duplicating device is employed as means to transfer the ID from the original key to the blank key; this one, after having been loaded with the ID, is used to receive from the vehicle central unit its secret code, and to store it, which then may be acquired, into the decrypted form, by the blank key itself.

It is here reminded that the secret code is the same both for the central unit 3 and for the original key 1; in the facts it could not be different, as if it were the case, it would be impossible to carry out the mutual authentication.

Therefore the blank key may transfer its still encrypted secret code into the duplicating device, which decrypts the secret code through suitable computing means and with advanced mathematical techniques.

Said computing means and said mathematical techniques are in se easily deductable from the prior art and generally are in the knowledge of the man skilled in the art, and therefore they will not be repeated.

The duplicating device now is informed of the central unit secret code, and therefore it is able of emulating it.

At this time the duplicating device is brought exactly in the same conditions where it is according to the previous procedure after the Step L, i.e. it contains both the ID and the decrypted secret code.

Therefore from this time on the procedure goes on exactly according to the Steps N, O, P, Q, R, S above described, obviously after having introduced the original key into the duplicating device.

More precisely, and with reference to FIGS. 4 and 5, the flow diagram of said procedures as follows:

A-1) the original key is introduced into the duplication device 4,

B-1) the duplication device emits a radio-electric signal which interrogates the original key, C-1) the original key responds by emitting a radio-electric signal which contains its ID, D-1) Said ID is received and stored into the blank key, E-1) The blank key is introduced into the vehicle lock and one or more attempts of starting the engine is made (the reason of carrying out more than one attempt has been already explained before), F-1) at each attempt of starting the engine, the vehicle center unit transmits to the blank key an electric signal which contains a random code encrypted by the algorithm which comprises the secret code, G-1) The blank key is removed from the vehicle lock and introduced into the duplication device, H-1) The duplicator through suitable computing and mathematical functions, in se known, decrypts the secret code and stores it, L-1) the blank key is removed from the duplicating device, M-1) the original key is introduced into the duplicating device. From this time on, the procedure goes on as from the previous Step L, i.e.:

N-1) the duplicating device interrogates the original key with a proper radio-electric signal containing the secret code, so emulating the central unit operation, Step O-1) the original key responds by transmitting a new own code, the PASSWORD;

Step P-1) the duplicating device stores such PASSWORD,

Step Q-1) the original key is removed from the duplicating device,

Step R-1) the blank key is introduced into the duplicating device,

Step S-1) the duplicating device transmits a radio-electric signal which contains: said PASSWORD, and the secret code, to said blank key; in the facts the ID has been already transmitted and stored during the previous Steps C-1 and D-1, Step T-1) The blank key stores into a defined memory said PASSWORD and the secret code.

It should have been noted that the flow diagram of said FIGS. 4 and 5 describe the procedure only from the initial Step A-I until the Step M-1.

As a matter of facts, the procedure goes on exactly as from the Step L of FIG. 2, to which it is referred for better clarity and brevity.

The invention claimed is:

1. A method of duplicating a motor vehicle electronic key, comprising:
    transmitting to the motor vehicle electronic key, by a first device, an encrypted secret code;
    receiving, by the motor vehicle electronic key, the encrypted secret code;
    as the electronic key is receiving the secret code which has been encrypted, intercepting the transmission to the motor vehicle electronic key by the first device, comprising the encrypted secret code, and storing, by a second device different from the first device and different from the motor vehicle electronic key, the encrypted secret code, which is extracted from the transmission;
    interrogating the motor vehicle electronic key, by a duplicator device which is different from the first device and different from the motor vehicle electronic key, using the encrypted secret code which has been intercepted and stored;
    receiving, by the duplicator device from the motor vehicle electronic key, a password transmitted from the motor vehicle electronic key in response to the interrogating;
    storing, by the duplicator device, the password transmitted from the motor vehicle electronic key;
    transmitting, by the duplicator device, the password to a blank key; and
    storing the password in the blank key.

2. The method according to claim 1, further comprising:
    sending, by a first device, an interrogating signal to the motor vehicle electronic key requesting identification information; and
    transmitting by the motor vehicle electronic key to the first device, an identification of the motor vehicle electronic key, in response to the interrogating signal,
    wherein the transmitting by the first device of the encrypted secret code to the motor vehicle electronic key is performed in response to the transmitting by the motor vehicle electronic key the identification of the motor vehicle electronic key.

3. The method according to claim 2, further comprising:
    decrypting, by the duplicator device, the encrypted secret code to form a decrypted secret code;
    encrypting, by the duplicator device, the decrypted secret code to form the encrypted secret code,
    wherein the interrogating of the motor vehicle electronic key is performed by using the encrypted secret code by the duplicator device.

4. The method according to claim 2, further comprising:
    transmitting, by the duplicator device, the identification of the motor vehicle electronic key; and
    storing, in the blank key, the identification of the motor vehicle electronic key.

5. The method according to claim 2, further comprising:
    transmitting, by the duplicator device, the encrypted secret code; and
    storing, in the blank key, the encrypted secret code.

6. The method according to claim 1, wherein:
    the intercepting is performed by the second device which is a sniffer device which is different from the first device and the duplicator device
    the method further comprising transmitting the encrypted secret code obtained during the intercepting by the sniffer device to the duplicator device.

7. A system for duplicating a motor vehicle electronic key which operates when there is a transmission to the motor vehicle electronic key, by a first device, an encrypted secret code and when there is a receiving, by the motor vehicle electronic key, the encrypted secret code, the system comprising:
    a receiver which, as the motor vehicle electronic key is receiving the encrypted secret code, intercepts the transmission to the motor vehicle electronic key by the first device, comprising the encrypted secret code, and stores the encrypted secret code, which is extracted from transmission;
    a transmitter, which is part of a duplicator device and different from the first device, which interrogates the motor vehicle electronic key using the encrypted secret code which has been intercepted and stored;
    a receiver, which is part of the duplicator device, which receives from the motor vehicle electronic key, a password transmitted from the motor vehicle electronic key in response to the interrogating;
    a memory, within the duplicator device, which stores the password transmitted from the motor vehicle electronic key;
    a transmitter, which is part of the duplicator device, which transmits the password to a blank key.

8. The system according to claim 7, further comprising:
    a decryptor which decrypts, within the duplicator device, the encrypted secret code to form a decrypted secret code;
    an encryptor which encrypts, within the duplicator device, the decrypted secret code to form the encrypted secret code,
    wherein the transmitter which interrogates the motor vehicle electronic key uses the encrypted secret code by the duplicator device.

9. The system according to claim 7, wherein the duplicator device comprises:
 a transmitter which transmits the identification of the motor vehicle electronic key to the blank key.

10. The system according to claim 9, wherein the duplicator device comprises:
 a transmitter which transmits the secret code to the blank key.

11. The system according to claim 7, further comprising:
 a sniffer, different from the duplicator device, which includes the receiver which intercepts and stores the encrypted secret code.

\* \* \* \* \*